(12) United States Patent
Figueroa

(10) Patent No.: US 6,490,177 B1
(45) Date of Patent: Dec. 3, 2002

(54) RESONANT POWER CONVERTER WITH PRIMARY-SIDE TUNING AND ZERO-CURRENT SWITCHING

(76) Inventor: Salvador Figueroa, 23905 Los Codona Ave., #101, Torrance, CA (US) 90505-5890

( * ) Notice: Subject to any disclaimer, the term of this patent is extended or adjusted under 35 U.S.C. 154(b) by 0 days.

(21) Appl. No.: 09/607,368

(22) Filed: Jun. 30, 2000

Related U.S. Application Data

(63) Continuation of application No. 09/408,496, filed on Sep. 30, 1999, now abandoned.
(60) Provisional application No. 60/103,134, filed on Oct. 5, 1998.

(51) Int. Cl.[7] .............................................. H02M 3/335
(52) U.S. Cl. ....................... 363/21.03; 363/97; 363/131
(58) Field of Search ..................... 363/97, 131, 21.03, 363/20, 16

(56) References Cited

U.S. PATENT DOCUMENTS

| | | |
|---|---|---|
| 4,415,959 A | 11/1983 | Vinciarelli |
| 4,675,797 A | 6/1987 | Vinciarelli |
| 4,709,316 A | 11/1987 | Ngo et al. |
| 4,720,668 A * | 1/1988 | Lee et al. .................... 323/271 |
| 4,785,387 A | 11/1988 | Lee et al. |
| 4,802,080 A | 1/1989 | Bossi et al. |
| 4,841,220 A * | 6/1989 | Tabisz et al. ............... 323/282 |
| 5,073,849 A | 12/1991 | Morris |
| 5,396,410 A | 3/1995 | Okochi et al. ................ 363/97 |

FOREIGN PATENT DOCUMENTS

| | | |
|---|---|---|
| JP | 5-260745 | 10/1993 |

* cited by examiner

Primary Examiner—Shawn Riley
(74) Attorney, Agent, or Firm—Donn K. Harms

(57) ABSTRACT

A DC power converter consisting of a series-resonant branch used to transform a DC voltage source into a DC current source exhibiting, a uni-polar, zero-current-switching characteristic. Frequency of the series-resonant branch, acting in concert with reflected load parameters, provides a forced oscillation frequency, Fo, component to an AC voltage source generated across the input winding of a power transformer by the resonant capacitor. Complex load parameters allow AC input current, displaced by 90° from the AC voltage source, to flow in the transformer primary winding throughout a composite, carrier-frequency cycle. Another component of the carrier-frequency consists of a resonant, natural oscillation frequency, Fn, resulting from resonance by the AC voltage source capacitance with the open-circuit inductance of the primary winding on the input power transformer. The composite carrier-frequency, Fo+Fn, transported through the input power transformer is directed to a rectifier/filter assembly and applied as a DC voltage to an output load. Thus, the uni-polar DC series-resonant branch is converted into an AC power transfer function, fully isolated from the input power switch, by the AC voltage source capacitor. The power transfer function characterizing a bi-polar power inverter requires a single power switch referenced to the input power return bus.

15 Claims, 10 Drawing Sheets

RESONANT POWER CONVERTER WITH PRIMARY-SIDE TUNING AND ZERO-CURRENT SWITCHING

This is a continuing of Application Ser. No. 09/408,496 filed Sep. 30, 1999 which is based on Provisional Application No. 60/103,134 filed Oct. 5, 1998.

BACKGROUND OF THE INVENTION

1. Field of the Invention

This invention relates to a zero-current switching DC power conversion process. And more specifically, resonant power converters using a series-resonant input stage to source AC voltage to an input power transformer via energy storage in the series-resonant capacitor. Wherein a compound frequency consisting of a forced sine wave oscillating frequency, Fo, couples to a resonant sine wave oscillating at its natural frequency, Fn. The two components combine to synthesize a composite, sine wave carrier-frequency providing a uni-polar and/or a bi-polar power supply transfer function to the power transmission loop.

2. Description of Prior Art

Sundry methods exist for converting an input level of DC power to another level for delivery to a prescribed load. Two conventional design methodologies in popular practice are generally classified as either: linear or switching mode. In view that either finds acceptance in certain application requirements neither enjoys the broad appeal of universal usage. Linear supplies exhibit low noise generation by virtue of internal power current remaining continuous while regulation is implemented by insertion of an artificial resistance exhibiting infinite resolution in series with the output load. While the variable resistance yields a low noise characteristic at the output terminals, objection is based on inefficient power transfer.

Switching supplies present a more efficient method for converting power from one voltage level to another. Power conversion in switching converters takes place by closing a power switch to couple the conversion circuit to an input power source during a portion of the transfer cycle. The power switch is opened during the remaining portion of the transfer cycle decoupling the power conversion circuit from the input power source and allow an energy charge, stored in the output integrating-filter inductance, to circulate through the output load. This method for converting power is very efficient since input current flows only during the time of power switch closure. Thus, input power is described in terms of duty cycle: Pin (pk) D. The principal drawback to this type of power conversion lies in the fact that switching action interrupts input current converting it into a train of discontinuous pulses. The resulting pulse train introduces a broadband frequency spectrum with a high-end, cut-off frequency, several orders of magnitude beyond the actual switching frequency.

Interruption of power current leads to circuit parasitics being bounded by a broadband frequency envelope. Transmission of frequency signals through the range in which parasitic L-C parameters resonate introduces ringing which becomes evident as noise on the output terminals. Suppression of this noise component resident on the output termination is a complex and tedious process that can impose serious penalty on conversion as well as volumetric efficiency.

Fortunately, 5V logic features a sufficiently wide noise threshold as to allow design procedures to become somewhat routine in their application. The same observation, however, does not necessarily apply toward evolving logic of lower voltage levels. Industrial trends toward 3V logic impose serious consideration with respect to tolerable noise envelopes. Further reduction of logic voltages to 1V, or fractional voltage levels, will require very high signal-to-noise ratios. In all probability, larger than can be accommodated by presently acceptable switching converter design disciplines.

SUMMARY OF THE INVENTION

An object of this invention is to describe a design process incorporating desired properties associated with either linear or switching power conversion design disciplines. Specifically, the low broadband noise envelope associated with linear power converter designs and the efficient, duty modulated, power transmission of high frequency switching topologies.

Another object of the invention is to define a design discipline in which an over-all DC to DC power conversion process incorporates an inner AC to DC power supply loop, wherein power supply input current is continuous throughout the entire power transmission cycle, and completely isolated from power switch transitions.

Another object of the invention is to illustrate capability of the inner power supply loop to accept any combination of half, or full-wave, rectifier/filter assemblies on the secondary windings of the isolation transformer for delivery of power to prescribed output loads.

Another object of the invention is to demonstrate a fly-back characteristic embedded in the resonant frequency, Fn, component which determines back-EMF impressed on the input power switch relative to design coefficient K selected for the composite carrier-frequency.

Another object of the invention is to illustrate a bi-polar power transmission process allowing non-polarized magnetic transformation and automatic re-set of the flux field in the magnetic core while using a single power switch referenced to the input power return bus.

Another object of the invention is to convey ready adaptability to synchronous rectification due to soft crossover of output and fly-back currents circulated in the transformer and rectifier/filter assembly.

The transfer functions described herein abide by standard industry definition for circuitry employed in power conversion applications. A power converter converts power from a DC source to a DC output. A power supply converts power from an AC source to a DC output. It is in this context that the power transfer function described herein embeds an inner power supply loop within an overall power converter transfer function. A practical circuit for achieving continuous AC current flow in a power transformer while responsive to variable switching for duty cycle control consists of a series-resonant circuit including an input DC voltage source; a resonating capacitor, a resonating inductor, a unidirectional conducting device and a power switch. The second stage, describing an AC voltage source. Is made up of a capacitor/transformer combination upon which a complex impedance, consisting of a reflected load component shunting the open-circuit inductance of the primary winding on the power transformer, acts as a load on the AC voltage source provided by the series-resonant energy storage capacitor. The load component acting on the capacitor introduces a time-constant that while working in concert with the angular velocity of the series-resonant input stage, serves to describe the sine wave frequency for the forced oscillation, Fo, component of the composite carrier-frequency.

The negative region of the AC voltage source waveform consists of a resonant frequency created by resonance between the voltage source capacitor and the open-circuit inductance of the primary winding on the power transformer. This frequency region introduces a resonant frequency component, Fn, to the composite carrier-frequency waveform. Power switch location in the series-resonant circuit places it outside the current loop formed by interactive energy circulation between the transformer's primary winding and the voltage source capacitor. Therefore, power switch transition does not interfere with continuous current flow through the transformer primary winding providing source energy to the AC power supply inner-loop.

The transformer's secondary winding acts as an intermediate hand-off to the current loop formed by the output integrating-filter for half-wave circuit configurations. In this instance, secondary winding current flows only during the power transfer stroke. Primary current, however, flows throughout the entire composite frequency cycle, with the negative voltage region providing the core flux re-set volt-seconds. Secondary winding current, however, remains continuous throughout its positive and negative region for full-wave circuit configurations. While primary winding properties remain the same for either half or full-wave rectification.

Design criteria inclusive of objects and brief general description above is further disclosed as a family of new resonant power converters based on primary-side resonance with zero-current-switching. The composite sinewave frequency applied to the primary winding of an input isolation transformer consists of a compound frequency whose constituent elements are predicated on a design coefficient K derived from the desired ratio of: Fn/Fo. The forced oscillation frequency, Fo, appearing as the positive transition in the composite waveform being somewhat dependent on the series-resonant input current source and the complex impedance impressed upon the capacitor/transformer loop by the open-circuit inductance of the isolation transformer acting in parallel with the reflected load resistance. The resonant frequency oscillation, Fn, appearing as the negative transition in the composite waveform is predicated wholly on the resonant elements in the parallel-resonant tank circuit, consisting of the resonant capacitor which terminates the series-resonant input current source and the transformer open-circuit inductance. Parallel-resonant circuitry is designed for maximum impedance in compliance with over-all dictates for minimal internal loss components to insure optimized transmission efficiency. The unloaded parallel-resonant circuit exhibits an inherent tendency for its internal impedance to migrate toward infinity due to regenerative properties characteristic of parallel-resonant tank circuitry.

The complex impedance impressed upon the parallel-resonant tank circuit, by the load resistance acting in parallel with the transformer's open circuit inductance, shunts the parallel-resonant tank circuit's inordinately high internal reactance in a manner in which the complex impedance being of a comparatively, low, ohmic value overwhelms the inordinately high value of the parallel-resonant tank circuit's internal reactance. A resulting 90° phase shift between voltage and current in the parallel-resonant tank circuit due to the quadrature relationship between the in-phase load and out-of-phase inductive components spreads the shunting impedance throughout the time-frame of the composite frequency Fo+Fn. Thereby stabilizing the entire power transmission carrier-frequency envelope.

DESCRIPTION OF THE INVENTION

Figure 5:
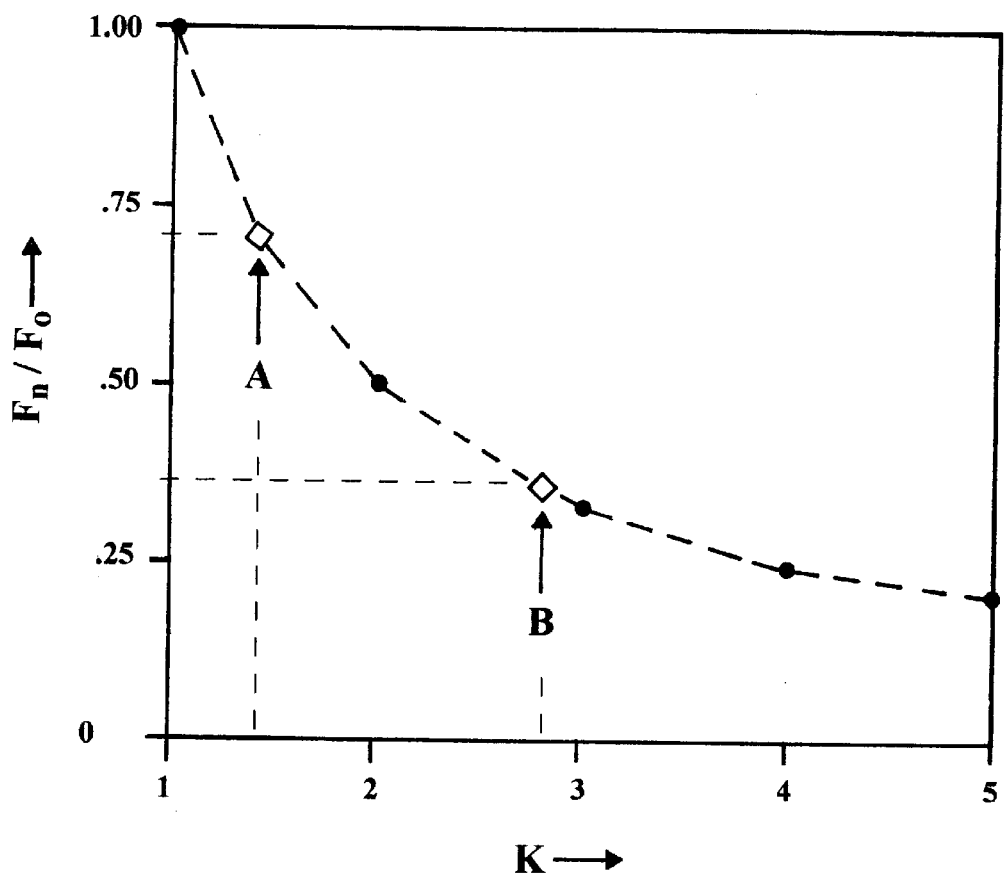
FIG. 5 plots the design coefficient K vs. Fn/Fo.
Figure 5A:
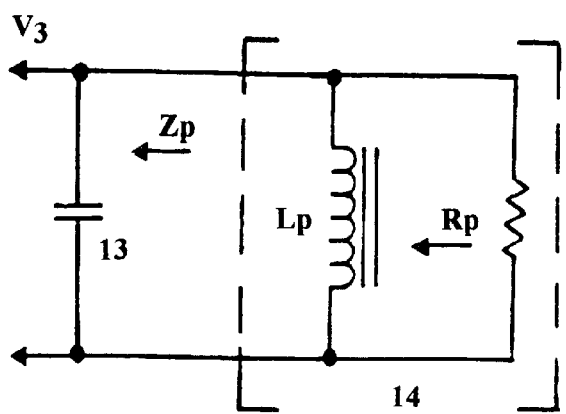
FIG. 5A is an electrical schematic depicting the equivalent circuit for the AC voltage source developed across transformer 14 primary winding during forced oscillation, Fo, frequency component of the composite carrier-frequency.
Figure 5B:
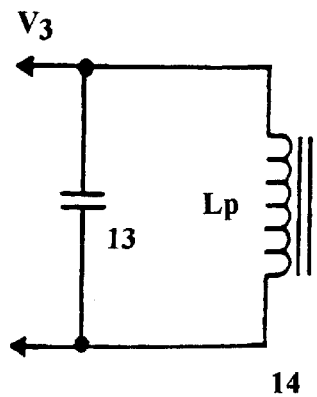
FIG. 5B is an electrical schematic depicting the parallel-resonant tank equivalent circuit for the resonant frequency, Fn, component of the composite carrier-frequency.

An overview of the power transfer function is provided by FIGS. 5, 5A and 5B. FIG. 5 plots the slope of Fn/Fo vs. design coefficient K. Where design coefficient K is a multiplier applied to the frequency of natural resonance, Fn, to derive an inverse function resulting in the slope Fn/Fo. FIG. 5A describes the image impedance reflected from the load, through transformer 14, to capacitor 13 during the period of forced oscillation, Fo. This impedance is defined as:

$$Zp = \omega LR/\sqrt{\omega^2 L^2 + R^2} \, \Omega \qquad (1)$$

Impedance Zp acts upon capacitor 13, in a manner to create a time-constant resulting in the discharge rate for capacitor 13 during the time of forced oscillation, Fo, where switch 10 has opened and transformer 14 output voltage $V_4$ is higher than Vo by the forward voltage of rectifying element 15. The discharge time constant is equal to:

$$Td = Zp \, C13 \, (S) \qquad (2)$$

Component Fo encloses a forced oscillation frequency equal to:

$$Fo = 1/(2\pi Td)(Hz) \qquad (3)$$

Fn is structured to equal Fo/K. Therefore; Lp, transformer 14 open circuit inductance, becomes:

$$Lp = [(1/2\pi)/Fn]^2/C13 \, (H) \qquad (4)$$

The resultant impedance, Zr, for the parallel-resonant combination of Lp/C13 in an unloaded condition during period, Fn, is equal to unity. This condition describes a state of anti-resonance, in which:

$$Zr = \omega^2 Lp \, C13 \, (1) \qquad (5)$$

Equation 5, above, describes the classical definition for a state of oscillatory anti-resonance. Operation within the realm of anti-resonance, however, is precluded by introduction of a load component to act upon the high reactance internal to the parallel-resonant circuit, formed by enclosure of identical reactive components operating 180° out-of-phase, as defined by transformer 14 open-circuit inductance acting upon capacitor 13. The result of transformer 14 open-circuit inductance being shunted by the reflected load resistance is that a quadrature current component, 90° out-of-phase with the AC voltage source, is impressed across the primary winding of transformer 14. This condition allows load current to flow in the AC voltage source throughout the entire composite frequency cycle, Fo+Fn. Voltage and current flowing continuously in the capacitor 13/transformer 14 interface describes an AC power source acting on the primary winding of transformer 14.

The AC voltage source introduces an AC power supply characteristic to the power transfer function allowing non-polarized power transmission embodied as either half or full-wave configuration. There are considerations associated with full-wave power transfer, which preclude deployment of certain rectifier/filter configurations for ultra-low output voltage applications as emphasized herein. Two of the most obvious are: full-wave bridge and the current-doubler rectifier, which is the full-wave version of the circuit shown in FIGS. 2 and 3. Objection to full-wave bridge rectification is based on the need for two rectifying elements placed in series with the output load voltage, seriously compromising power transfer efficiency in ultra-low voltage applications. While the negative aspect embodied in the current-doubler rectifier is that two output filter inductors are required in the rectifier/filter assembly thus seriously compromising volumetric efficiency due to high current circulation in ultra-low voltage applications. Therefore; circuits shown in FIGS, 2, (3) and 4 constitute preferred embodiments. The first embodiment being a half-wave circuit configuration while the second embodiment describes a full-wave topology.

Figure 1:
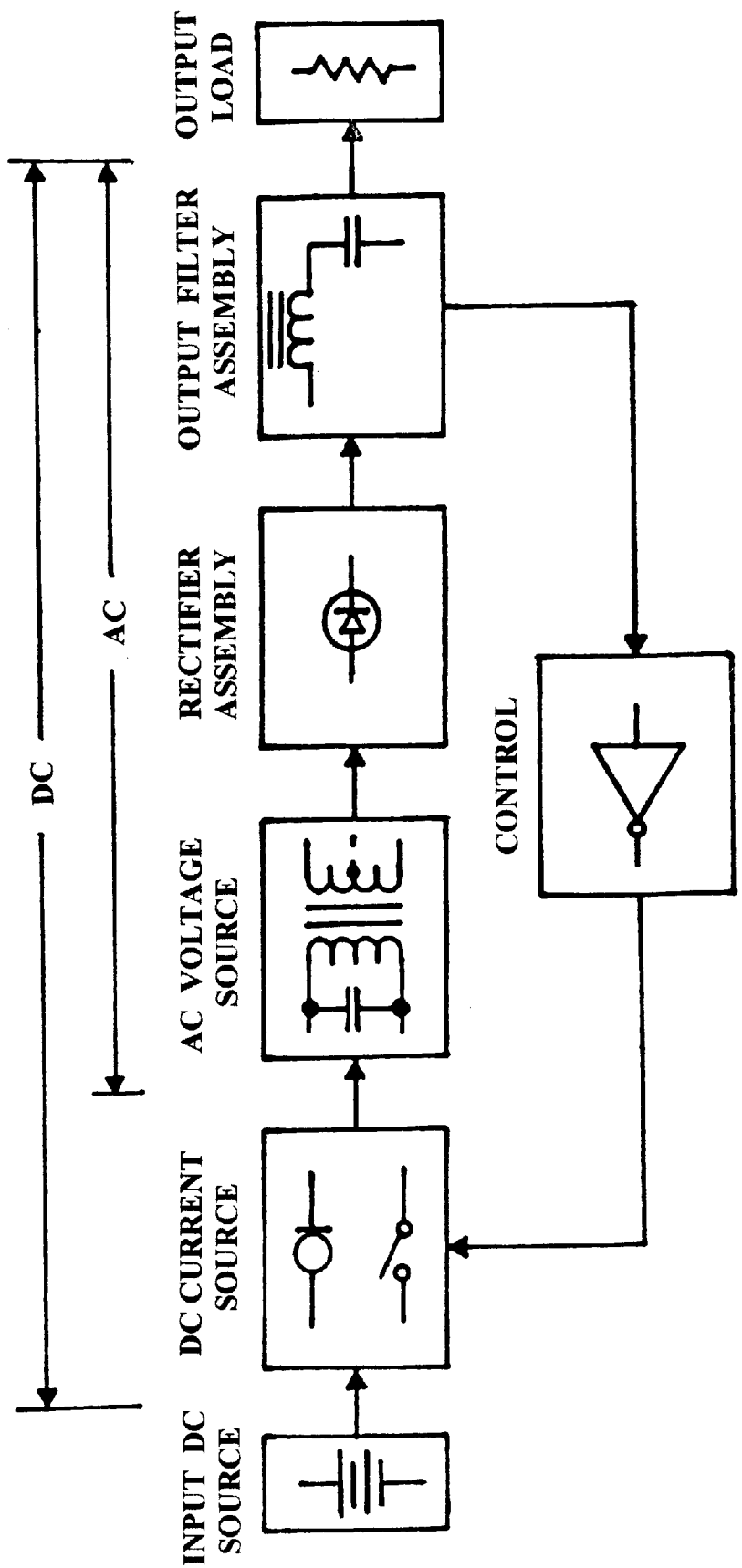
FIG. 1 is a block diagram illustrating subordinate functional blocks for overall DC to DC power flow including the AC power transmission loop incorporated within the DC power transmission pulse train embodied in the invention.
Figure 15:
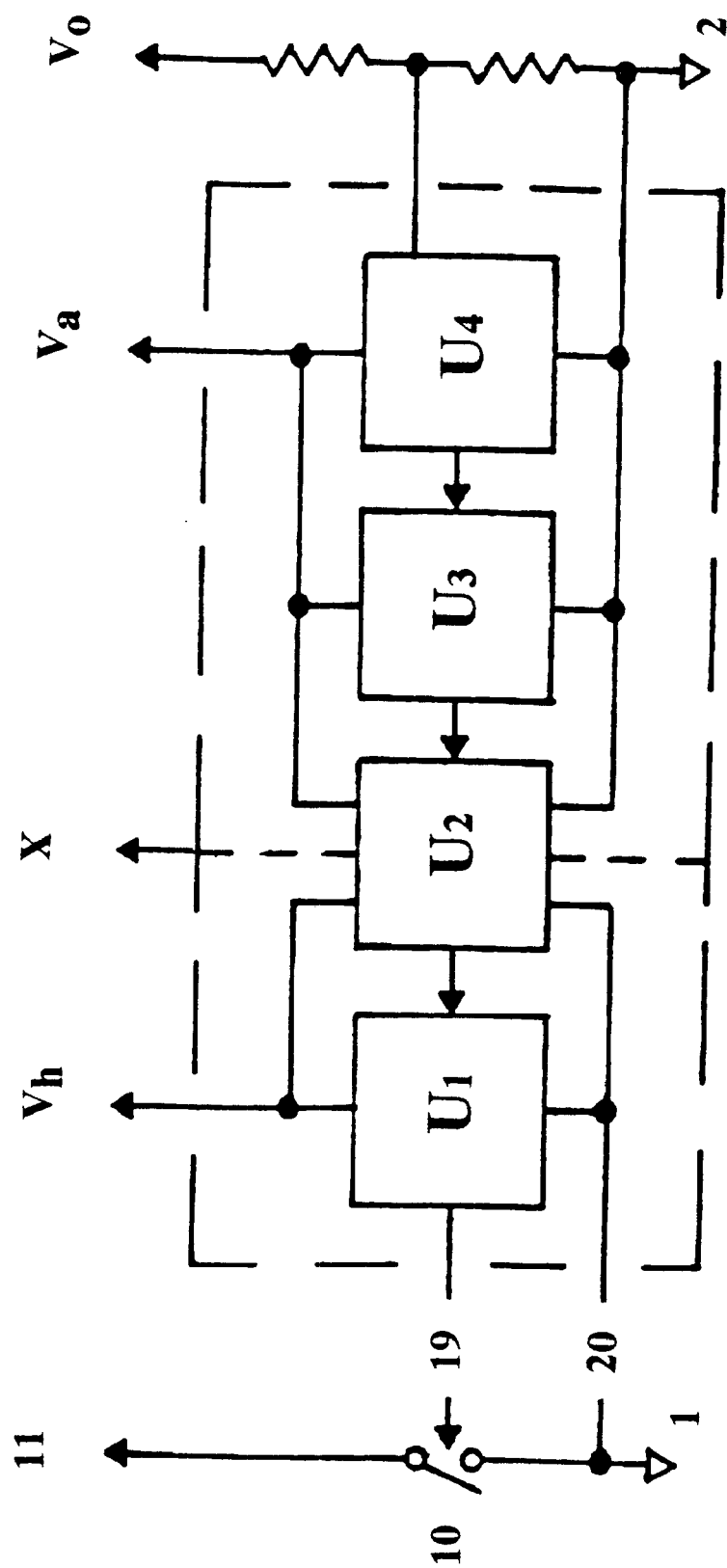
FIG. 15 describes the functional block diagram for the Pulse-Position-Modulation (PPM) feedback control loop including a DC isolation stage denoted by dashed line X.

FIGS. 1 and 15 are stand-alone descriptions of over-all power and or control signal flow. Since their general description applies to all circuit configurations included herein, they are described as separate items prior to the detailed description of specific circuits with associated plots and graphs.

Block Diagram of FIG. 1

The block diagram of FIG. 1; defines flow of energy for the entire process of accepting a quantum charge from an input DC voltage source, processing of the energy envelope, and ultimately depositing said energy packet across an output filter capacitor for delivery to an appropriate DC load. The series consisting of:

INPUT DC SOURCE: denotes a primary DC power source, whether in the form of a battery, isolated DC power supply or rectified and filtered AC mains;

DC CURRENT SOURCE: Consists of a resonating inductor switched between the DC voltage source and a resonating capacitor by a power switching device inserted in the input power return line;

AC VOLTAGE SOURCE: Illustrates components, consisting of a series-resonant capacitor terminated across the input winding of a power transformer, required to describe the AC source voltage. A forced sine wave oscillation generated in part by the voltage developed across the series resonant capacitor via energy delivered by the series-resonant inductor while the power switch is turned-on. And also by the time-constant impressed upon the voltage source capacitor by load components in the transformer primary winding. The embedded time-constant describes capacitor voltage decay-slope after the power switch is turned-off. These two parameters combine to describe a forced frequency oscillation, Fo, across the transformer primary winding during the positive voltage transition. The negative voltage excursion describes a resonant, natural frequency oscillation, Fn, due to resonance between the voltage source capacitance and the open-circuit inductance of the power transformer primary winding. The resulting composite waveform, Fo+Fn, consists of both sine wave components at their respective frequency contribution. Transformer input voltage composite waveform is transposed to output windings common to the transformer core by mutual coupling. Transformer output windings may be single-ended, for half-wave rectification, or double-ended with or without center-tap, for full-wave rectification.

RECTIFIER ASSEMBLY: Typifies AC signal rectification by either static or active commutation. While circuit symbols used are for minority-carrier, p-n junction devices, the reference designations are only symbolic. In actual practice, passive rectification would include Schottky diodes. And power FET's would be used for active commutation in the form of synchronous rectification. Actual rectifier implementation may be half-wave, full-wave or any mix thereof for multiple output applications.

OUTPUT FILTER ASSEMBLY: Signifies integrating L-C filtering to attenuate the AC component applied on the filter assembly by transformer output winding voltage. Practical inductors may consist of individual, or multiple, elements in the filter assembly. Integrating L-C filter is also referred to as a smoothing filter assembly for full-wave applications.

OUTPUT LOAD: Indicates user load designated to accept power from the DC conversion process.

CONTROL: Incorporates the PPM negative feedback control loop with a DC barrier enclosed within the control loop for isolating the input power return line from the output return bus.

Block Diagram of FIG. 15

The diagram for FIG. 15 defines signal flow from the error signal detected at the output terminals, processed for appropriate gain, phase and voltage level. The signal is then applied to the gating terminal of the power switch for modulating the proper pulse position of the drive signal resulting in regulation of the output terminals. Vh is housekeeping voltage. Va is auxiliary voltage derived from the output.

U4: Consists of an operational amplifier sensing the output voltage level and comparing it to an internal reference. Any deviation on the output from the pre-set internal reference level develops an error signal, amplified by the internal gain and generated as an output signal.

U3: Is a monostable multivibrator whose output pulse position is predicated on the level of output voltage generated by U4 and applied on the modulation input pin.

U2: defines an optical isolator to introduce DC isolation between U3 and U1, isolating the output return bus from the input return line. The isolation device may rely on magnetic separation of the signal as an option to optical isolation, and may be inserted at any convenient point between U2 and input to U4.

U1: Describes a high current driver whose output pulse is dependent on the signal applied to the input terminal by the DC isolator, U2. Output from U1 is applied to the gate terminal of power switch 10 through output line 19, routed to input power return line 1, and returned to the control circuit through signal return line 20.

Figure 2:
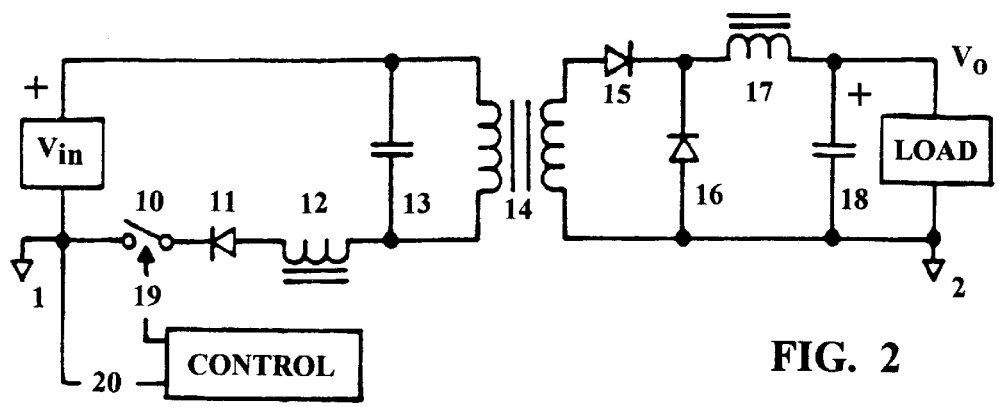
FIG. 2 is a circuit schematic illustrating the first embodiment as a half-wave rectifier/filter implementation.
Figure 3:
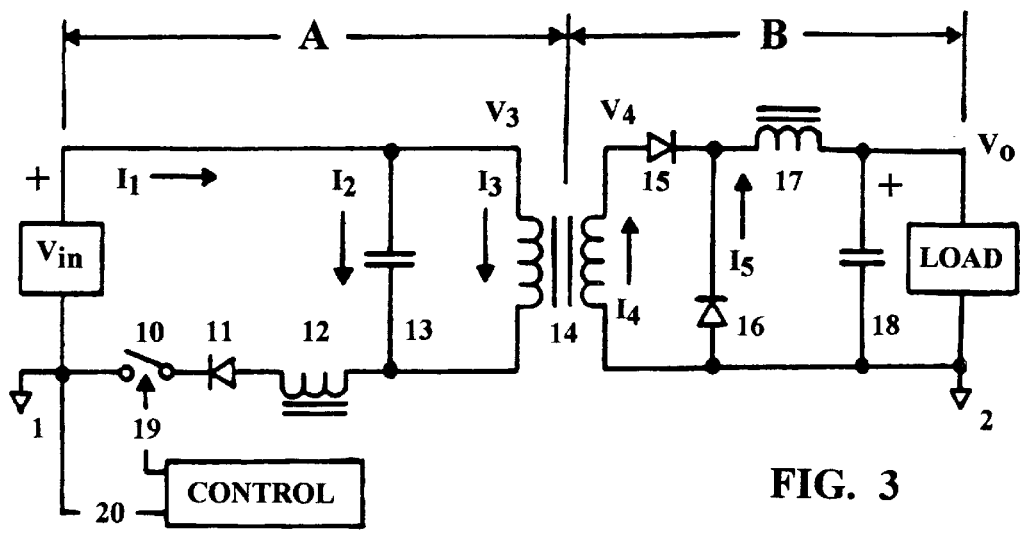
FIG. 3 describes a circuit schematic of the first embodiment illustrating the two principal functional loops, input functional loop—A, and output functional loop—B.
Figure 4:
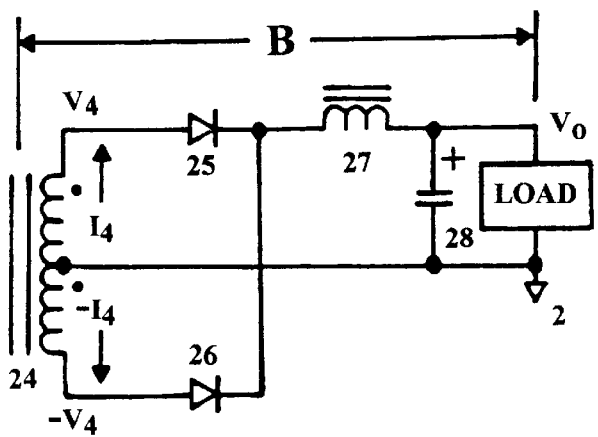
FIG. 4 denotes a schematic diagram for output functional loop—B configured as a full-wave, center-tapped, rectifier/filter implementation illustrating the second embodiment.
Figures 6, 7:
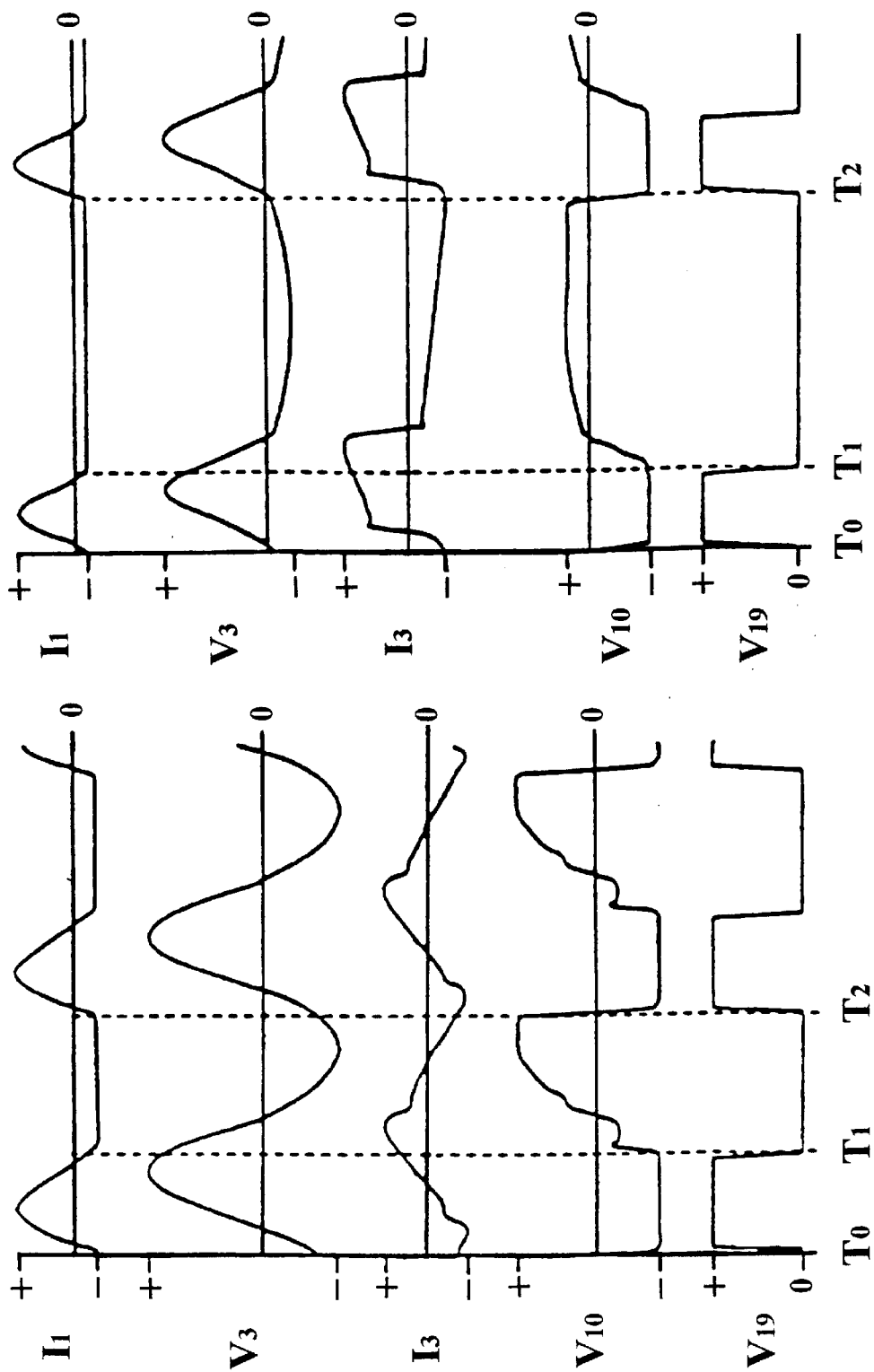
FIG. 6 illustrates an oscillographic plot of voltages and currents vs. timing signal $V_{19}$ for functional loop—A, a design coefficient K of 1.41, transformer 14 (24) output winding polarity either additive or subtractive and an output rectifier/filter configuration of either half or full-wave implementation.
FIG. 7 illustrates an oscillographic plot of voltages and currents vs. timing signal $V_{19}$ for functional loop—A, a design coefficient K of 2.82, transformer 14 output winding polarity either additive or subtractive and an output rectifier/filter configured in half-wave implementation.
Figure 8:
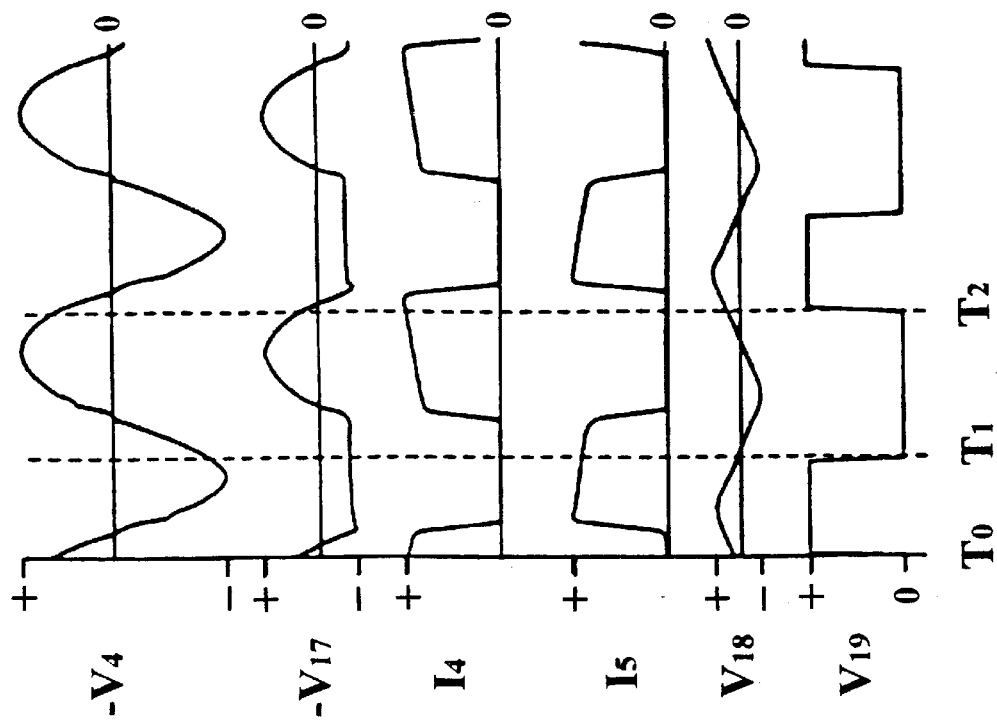
FIG. 8 illustrates an oscillographic plot of voltages and currents vs. timing signal $V_{19}$ for functional loop—B, a design coefficient K of 1.41, a half-wave rectifier/filter implementation and additive polarity of transformer 14 output winding with respect to input winding.
Figure 12:
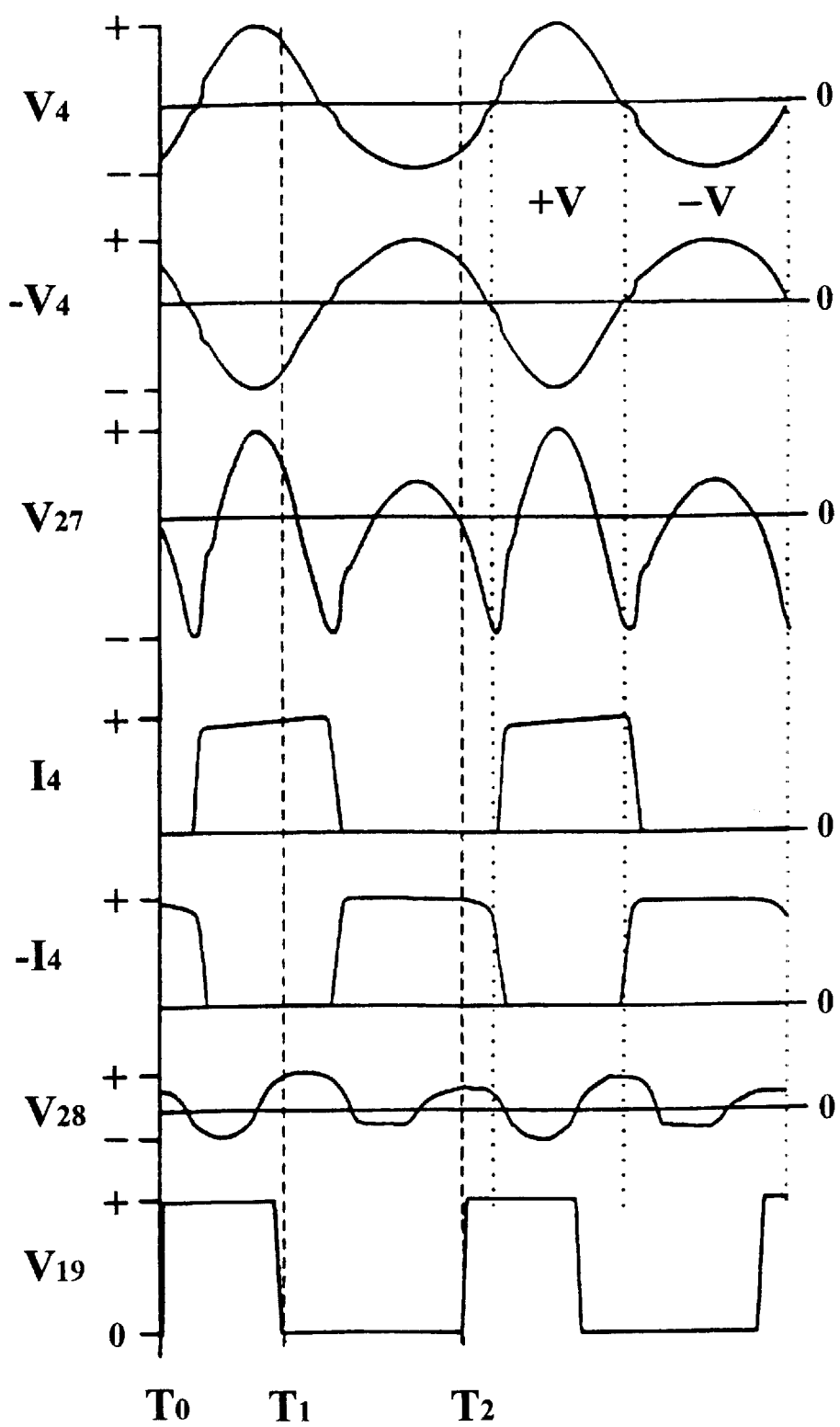
FIG. 12 illustrates an oscillographic plot of voltages and currents vs. timing signal $V_{19}$ for functional loop—B, a design coefficient K of 1.41, and full-wave, center-tapped, rectifier/filter implementation on transformer 24 output winding.

FIG. 2 describes a generalized power schematic showing principal circuit elements for a half-wave rectifier/filter configuration. Circuit schematic in FIG. 3 is the same as that for FIG. 2 except that functional loops—A and—B are isolated with principal voltages and currents being identified as part of circuit representation. Description of circuit function will reference FIG. 3 in that related waveform designations in subsequent, and associated, figures are based on FIG. 3 reference designations. Related waveforms for input functional loop—A, enclosing flow of power extending from the input DC voltage source Vin to the primary winding of transformer 14 are shown in FIG. 6. Waveforms for output functional loop—B, enclosing flow of power from the output winding of transformer 14 to the output load are shown in FIG. 8 for additive winding polarity, and in FIG. 9 for subtractive winding polarity. FIG. 12 illustrates waveforms for functional loop—B enclosing flow of power from the output center-tapped winding of transformer 24 as shown in FIG. 4, to the output load for a full-wave rectifier/filter configuration. FIGS. 6, 8, 9 and 12 are based on a design coefficient K of 1.41 with respect to FIG. 5.

Figure 10:
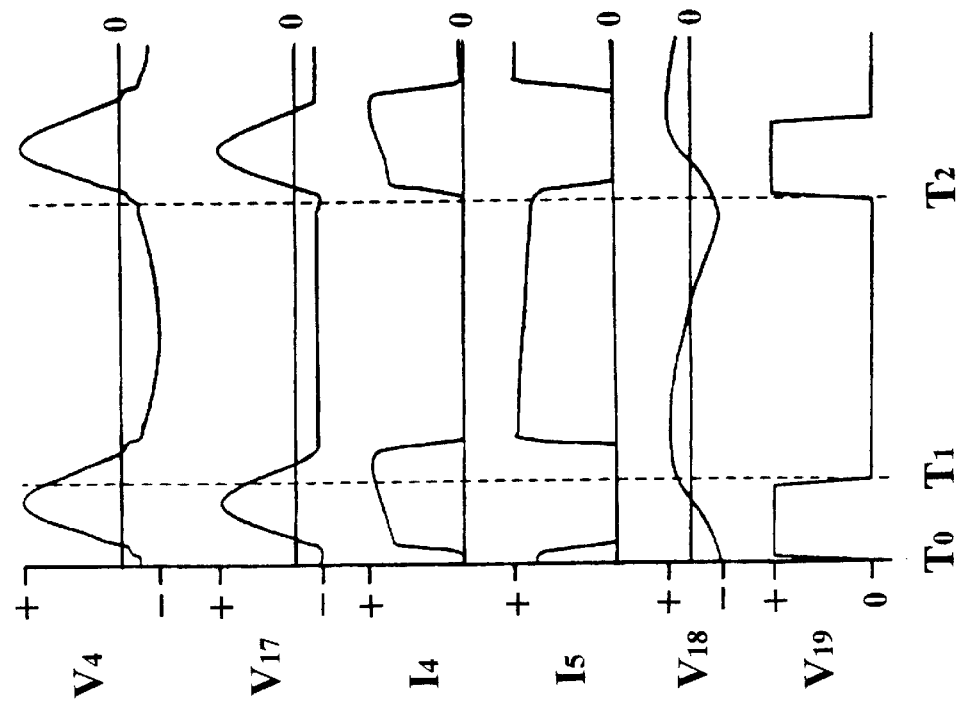
FIG. 10 illustrates an oscillographic plot of voltages and currents vs. timing signal $V_{19}$ for functional loop—B, a design coefficient K of 2.82, half-wave rectifier/filter implementation and additive polarity of transformer 14 output winding with respect to input winding.

FIG. 7 denotes principal waveforms for input functional loop—A. Output waveforms for functional loop—B are shown in FIG. 10 for additive winding polarity and in FIG. 11 for subtractive winding polarity terminated into the half-wave rectifier/filter configuration of FIG. 3. And are based on a design coefficient K of 2.82 with respect to FIG. 5.

Power flow in FIG. 3 is as follows: Alternate closure and opening of power switch 10 impresses a series of ON and OFF pulses in functional loop—A. This portion of the power transmission loop consists of a DC voltage source, Vin, a positive DC power bus connecting capacitor 13 and the input terminal of transformer 14 to Vin. The opposite terminal of transformer 14 is connected to the opposite terminal of capacitor 13. This juncture connects to inductor 12, whose opposite termination connects to the input of a unidirectional conducting device 11, while the output of unidirectional conducting device 11, connects to the drain terminal of power switch 10. The source terminal of power switch 10 connects to Vin via return bus 1. Control circuit command signal is routed to power switch 10 gate terminal through signal input line 19, directed to power bus return line 1 and returns to the control circuit via control return line 20.

Control of the pulse train applied to the gate terminal of power switch 10, is provided by the PPM control circuit described in the block diagram of FIG. 15. Input current $I_1$ is at zero amplitude during time of control circuit turn-on command. $I_1$ initiates at time $T_0$ and progresses toward its peak half-sine level at a time-variable rate consistent with the angular velocity of forced oscillation frequency, Fo, in the series-resonant tank circuit formed by resonating elements, inductor 12 and capacitor 13. $I_1$ then decays to zero current at the same time-variable rate. Power switch 10 is commanded to open when current $I_1$ reaches zero. The on-time transition for power switch 10 is fixed by circuit constants while off-time transition is a variable parameter controlled in the PPM feedback loop. Thus, the off-time transition may be set to coincide exactly with $I_1$ zero amplitude upon termination of the power pulse.

Current $I_1$ is composed of two discrete components, $I_2$ and $I_3$. $I_2$ transfers a precise quantum of energy into resonating capacitor 13. While current $I_3$, construed from a complex quadrature impedance, transfers its in-phase component through windings on transformer 14 to the output integrating-filter consisting of inductor 17 and capacitor 18 then to the output load, Vo. Load current returns to the output winding of transformer 14 through output return bus 2. The out-of-phase component consists of magnetizing current, Im, generated by the, dv/dt, flux field in the magnetic core of transformer 14. The magnetizing component of current $I_3$ simply circulates in the parallel-resonant tank circuit formed by resonating capacitor 13 and the open-circuit inductance of the primary winding on transformer 14. Circulation of magnetizing current, Im, results in the generation of a negative voltage during the period of natural frequency oscillation, Fn, re-setting the core's magnetic flux field to zero.

The in-phase component of current 13 terminates when output voltage $V_4$ decays to a level equal to output voltage Vo plus the voltage drop $V_f$ of the rectifying element in series with the output voltage. This voltage threshold transposed to the primary winding of transformer 14 is not abrupt, but rather a gradual transition from output rectifying element 15 to fly-back rectifying element 16 for a time duration governed by the decay-rate of the sinusoidal waveform. A current component sourced by output filter inductor 17 is circulated through the windings of transformer 14 with a polarity such as to induce a negative current through resonating capacitor 13. Transformer 14 during this portion of the cycle acts as a current transformer with leakage inductance providing the required ballast to support the short-circuit imposed on the secondary winding by simultaneous conduction of both rectifying elements 15 and 16. The short circuit terminates upon rectifying element 16 going into full conduction, and rectifying element 15 going into a full blocking state. Current circulated by the output filter inductor 17 is then by-passed from the transformer output winding by rectifying element 16 and transformer 14 assumes a voltage characteristic. Restoration of a voltage characteristic on transformer 14 allows parallel-resonant tank oscillation at its natural frequency, Fn, for what is essentially a pure inductance and capacitance.

The quadrature impedance formed by the open-circuit inductance in parallel with the reflected load resistance introduces a lagging 90° phase shift between voltage $V_3$ and current $I_3$ resulting in flow of current $I_3$ throughout the entire composite frequency cycle. Thus, the low impedance generated during the forced frequency, Fo, portion of the cycle is transposed into the natural frequency, Fn, region of the cycle. In a manner to shunt the parallel-resonant tank's internal reactance, which has a tendency to migrate toward infinity, and thereby stabilize the parallel-resonant tank's characteristic impedance throughout the entire composite frequency cycle. A negative voltage swing results from the inductance of transformer 14 primary winding resonating with capacitor 13 while disconnected from the input voltage source Vin by the fully opened power switch 10. Time-duration for the negative voltage transition on the transformer primary winding produces the same volt-second product on transformer 14 magnetic core as that impressed during the positive excursion. Thus, transformer 14 magnetic core is automatically re-set during the period of natural frequency, Fn. Negative current flow in the primary winding remains the same during the period of natural frequency oscillation, Fn, as that introduced during the positive forced oscillation, Fo. This holds true due to design coefficient K introduced into the equation defining components embedded in the composite frequency describing one complete cycle of operation. AC voltage source internal impedance is the result of inductive reactance shunted by reflected load resistance during the period of forced oscillation, Fo. The time base during the portion of negative voltage swing for transformer 14 input winding increased by design coefficient K while voltage amplitude decreased by a proportional amount in order for the volt-second product to remain the same. This means that transformer 14 input winding reactance also diminished by a similar amount due to a reduction in angular velocity. Therefore; current $I_3$ amp-second product remains equal in amplitude for either positive or negative excursions around the zero voltage reference in compliance with the duty cycle imposed by ratio of Fo/(Fo+Fn) derived in the time domain.

Following description of circuit operation refers to the first embodiment based on a design coefficient K of 1.41. Referring to FIG. 3, successive closure of power switch 10 establishes a state of equilibrium in functional loop—A allowing power switch 10 transitional states to migrate to their natural time-domain. This juncture, within the prescribed time base, is coincident with the amplitude of the average volt-second product enclosed in the Fn portion of the cycle for the on-time transition as a fixed event. The off-time transition, being a design variable, is set to occur at some point beyond the cross-over threshold of the average volt-second amplitude for the forced oscillation, Fo, period of the decaying voltage across resonating capacitor 13, but before it decays below the projected level of DC voltage source Vin. Power switch 10 turn-off in this region insures zero-current switch transition and prevents inadvertent turn-on of unidirectional conducting device 11 which commutated upon depletion of energy content in resonating inductor 12 at the crest of sinusoidal voltage generated across resonating capacitor 13.

The basis for this contention being that the average voltage amplitude for the power stroke sine wave, Fo, is 0.637 of the peak voltage, while the level of super-imposed DC voltage source Vin is 0.50 of peak resonating capacitor 13 voltage. These ratios hold true when resonating capacitor 13 voltage is allowed to rise to two times the DC voltage source Vin as is the case in this design regimen. Additionally, power switch 10 turn-off in this region assures that series-resonant inductor 12 transfers the required energy envelope from the DC voltage source Vin to fully charge resonating capacitor 13 and provide required current to the primary winding of transformer 14.

Resonating capacitor 13 charges to peak voltage within the prescribed time-period determined by series-resonant inductor 12 working in conjunction with the loaded primary winding of transformer 14 in parallel with resonating capacitor 13. The resulting frequency, which is the inverse of the time required to charge and discharge resonating capacitor 13, is set by parametric filter design. Illustrated in part by the equivalent circuit of FIG. 5A, and numerically characterized in equations (1), (2) and (3) herein, to coincide with the forced period of oscillation, Fo, for the AC voltage source formed by resonating capacitor 13 and the primary winding of transformer 14. Therefore; the time-constant incorporated in the series-resonant branch working in conjunction with the reflected impedance serves to determine time duration for the power stroke, Fo, impressed as an AC voltage source on the input winding of transformer 14 by resonating capacitor 13. AC voltage on the input winding of transformer 14 is transferred to the secondary winding via mutual coupling by the flux field generated in the magnetic core of transformer 14.

FIG. 5 provides a continuous slope ratio for Fn/Fo from which a specific design coefficient K may be derived. Design point—A designates a design coefficient K of 1.41 while design point—B defines a design coefficient K of 2.82. Whereby frequency ratio Fn/Fo=1/K, larger design coefficients K yield lower fly-back voltages appearing on the primary winding of transformer 14 as a negative voltage swing during the time period of natural oscillation, Fn. The flyback component $-V_3$ combines with the input DC voltage source Vin in an additive manner to define power switch 10 hold-off voltage. Given this consideration, it is obvious that low levels of input DC voltage sources tolerate low values of design coefficient K. Under certain conditions even a design coefficient K equal to unity. For other input line stipulations where high input DC voltage sources are encountered, a higher design coefficient K is required to maintain power switch 10 hold-off voltage within tolerance of readily available power switches.

FIG. 5A, as discussed earlier, describes the equivalent circuit embedded in the AC voltage source during time-period of forced oscillation, Fo. FIG. 5B, also discussed earlier, defines the equivalent circuit for the parallel-resonant tank during time-period of natural oscillation, Fn.

FIG. 6 illustrates corresponding waveforms for input functional loop—A referenced to the time-base of power switch 10 drive signal $V_{19}$ provided by the control circuit. Input current $I_1$ initiates at time $T_0$ and terminates at $T_1$. Voltage $V_3$ is at the average value of the sinusoidal envelope for $-V_3$ at time $T_0$. Transformer 14 input current $I_3$ lagging voltage $V_3$ by 90°, reaches its negative peak at the time $-V_3$ crosses the 0 (zero) voltage reference time line. Power switch 10 voltage $V_{10}$ encloses a composite waveform consisting of the DC voltage source and the back-EMF generated by the flyback characteristic predicated on the design coefficient K employed.

FIG. 8 defines principal waveforms for output functional loop—B referenced to the time-base of power switch 10 drive signal $V_{19}$ provided by the control circuit. Transformer 14 output voltage $V_4$ initiates at time of average value for the sinusoidal envelope of $-V_4$ at time $T_0$, and is positive with respect to the 0 (zero) voltage reference time line consistent with the polarity of transformer 14 input voltage $V_3$. Output inductor voltage $V_{17}$ is also positive at this time. Output current $I_4$ flows during the time inductor voltage $V_{17}$ is positive. Fly-back current $I_5$ flows during the time inductor voltage $V_{17}$ is negative with respect to the 0 (zero) voltage reference time-line. Output ripple voltage $V_{18}$ is virtually noise-free due to isolation of the AC power supply, sourcing the input to transformer 14, from the switching action of power switch 10.

Figure 13:
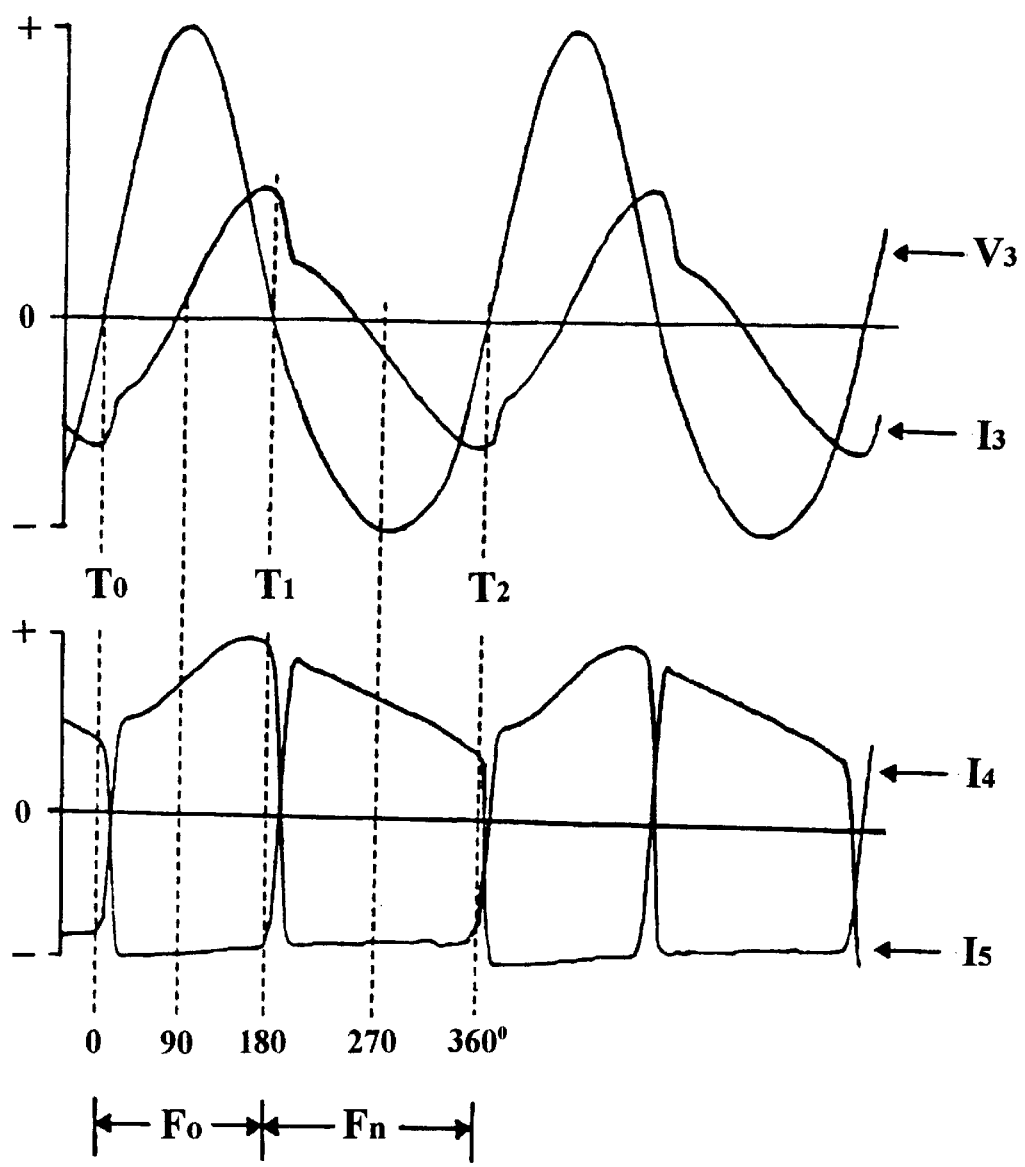
FIG. 13 shows an enlarged view of an oscillographic plot for transformer 14 input voltage $V_3$ vs. input current 13 generated in functional loop—A; at a design coefficient K of 1.41. Input waveform plot is compared to output currents 14 and 15 flowing in functional loop—B, referenced to the angular/time baseline of 0 (zero) amplitude, for composite waveform frequency components Fo+Fn.

FIG. 13 is an expanded illustration of AC voltage $V_3$, and current $I_3$ circulated in the parallel-resonant tank circuit consisting of capacitor 13 and the input winding of transformer 14. Voltage $V_3$ and current $I_3$ are plotted on a time-line referenced to 0 (zero) voltage. Voltage $V_3$ and current $I_3$ are shown in FIG. 6 as well, but are referenced to transitions represented by power switch 10 gating voltage $V_{19}$ as applied by the PPM control circuit. The lagging 90° phase-shift between $V_3$ and $I_3$ is more clearly demonstrated in FIG. 13 by the waveforms being referenced to the 0 (zero) volt baseline. Output currents $I_4$ and $I_5$ are also included in FIG. 13 and are plotted on a vertical baseline relative to $V_3$ and $I_3$. Waveforms plotted in FIG. 13 are based on angular/time reference lines to more clearly illustrate horizontal baseline relationships existing between both sets of waveforms. Output currents $I_4$ and $I_5$ are shown in FIG. 8, but referenced against gating voltage $V_{19}$. Waveforms plotted in FIGS. 6 and 8 do not readily discern instantaneous relationships between the two sets of waveforms due to the size of the trace and the waveform plots being presented in two separate figures where a relative baseline is difficult to visualize. FIG. 13 serves to clearly show the impact of crossover currents, $I_4$ vs. $I_5$, during transitions between Fo and Fn on input waveforms $V_3$ and $I_3$. Waveform traces serve to illustrate current $I_3$ continuity independent of power switch 10 transitions by virtue of capacitor 13 transformer 14 combination being isolated from power switch 10. Separation of power switch 10 from the AC voltage source allows an independent bi-polar transmission function to develop across the input winding of transformer 14 as described by the composite transfer cycle, Fo+Fn.

Figure 9:
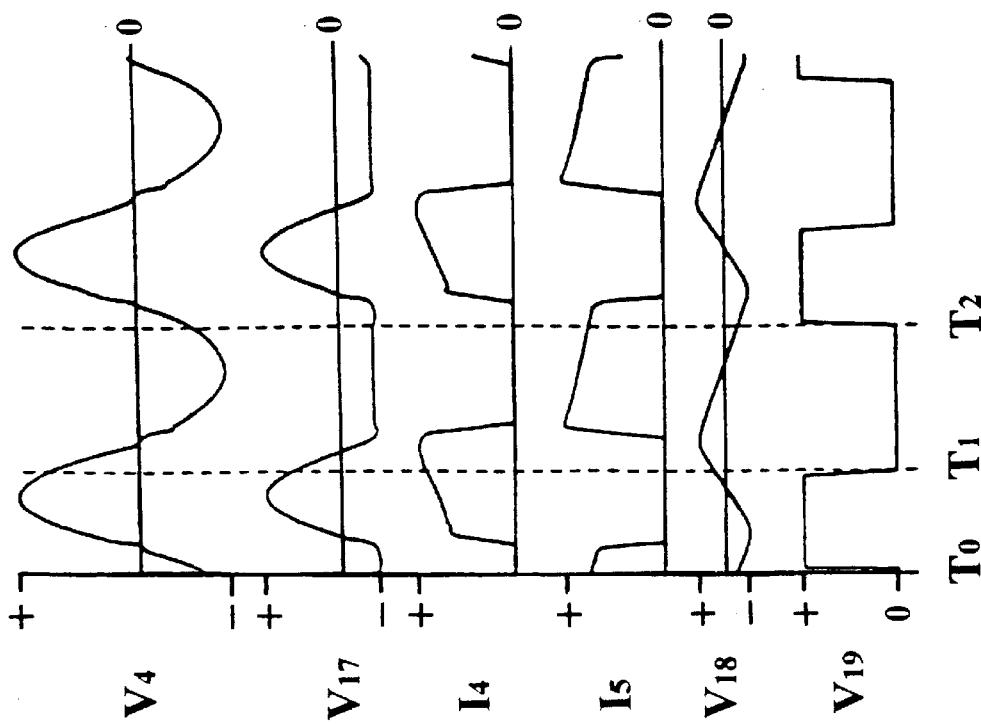
FIG. 9 illustrates an oscillographic plot of voltages and currents vs. timing signal V19 for functional loop—B, a design coefficient K of 1.41, half-wave rectifier/filter implementation and subtractive polarity of transformer 14 output winding with respect to input winding.

Following description of circuit operation refers to the first embodiment based on a design coefficient K of 1.41 and reversal of winding polarization on transformer 14. Referring to FIGS. 3 and 6. Design, function and waveforms are identical to the case for additive winding polarity described above, due to the bi-polar transfer function embedded in the AC voltage source impressed on the input winding of transformer 14. Inverting of a winding on transformer 14 results in a polarity reversal for the voltage and current waveforms generated in the pulse power train transmitted through transformer 14. FIG. 9 defines waveforms enclosed in functional loop—B for the subtractive polarity case. Transformer 14 output voltage $-V_4$ is negative during time $T_0$ to $T_1$. It initiates at the juncture of the average volt-second envelope of the positive sine wave during the positive transition of power switch 10 drive signal $V_{19}$. $-V_4$ voltage turns-off at time $T_1$ when it is decaying toward 0 (zero) and is above the level of DC voltage source Vin corrected by the turns ratio of transformer 14, equal to 0.50 of $-V_4$ peak voltage. Output filter inductor voltage $-V_{17}$ is also negative at this time, allowing flyback current $I_5$ to flow. Output voltage $-V_4$ swings positive during time $T_1$ to $T_2$, when power switch 10 is off. Filter inductor voltage $-V_{17}$ also swings positive during this time allowing flow of load current 14. Output ripple voltage $V_{18}$ is virtually free of noise harmonics as in the case for additive transformer 14 polarity.

| | | | |
|---|---|---|---|
| Po (pk): | $[V_4 (pk)/(\pi/2)]$ Io | (W) | (6) |
| E: | Po (pk) T (on) | (J) | (7) |
| C13: | $2E/V_3 (pk)^2$ | (F) | (8) |
| L12: | $[(½\pi)/Fo]^2/C13$ | (H) | (9) |
| Fn: | Fo/K | (Hz) | (10) |
| Lp: (T14/24) | $L12(K)^2$ | (H) | (11) |
| Zt: | $\sqrt{L12/C13}$ | (Ω) | (12) |
| $I_1$: | $V_3/Zt$ | (A) | (13) |
| $I_2$: | Q13/T | (A) | (14) |
| $I_3$: | $[(I_1-I_2)]$ | (A) | (15) |

The following description of circuit operation refers to the first embodiment based on a design coefficient K of 2.82. Circuit configuration is based on that of FIG. 3. Functional operation is identical to that described for design coefficient K of 1.41, with the principal difference between the two routines being characterized more as quantitative than functional. While power switch 10 turn-on occurs at the same crossover amplitude of the average volt-second envelope for the natural frequency of oscillation, Fn, waveform. This juncture is much lower in amplitude, being almost coincident with the zero volt reference of transformer 14 input voltage $V_3$. Power switch 10 turn-off command still occurs at some arbitrary point between the magnitude of average volt-second content for the forced frequency, Fo, and the level of DC voltage source Vin projected through the waveform of transformer 14 input voltage $V_3$. In this instance, however, the volt-second envelope absorbed by resonant inductor 12 is considerably less than that absorbed in the case for the first embodiment incorporating a design coefficient K of 1.41.

Another difference of significant consequence is that the in-phase component of current $I_3$ is considerably larger due to reduction in transformer 14 turns ratio. A reduction in transformer turns ratio translates into reducing resistance reflected across the magnetic interface of transformer 14 by a square function. Coupling this significant reduction in load resistance reflected to the input winding of transformer 14, to an increase in design coefficient K from 1.41 to 2.82 yields an increase in transformer open-circuit inductance by a factor of $(2.82/1.41)^2$, assuming that resonating capacitor 13 remains unchanged. Given the parametric changes noted above, the resultant impedance in the primary winding of transformer 14 becomes much more resistance driven as opposed to that observed for a design coefficient K of 1.41. Input impedance Zp resident in the primary winding of transformer 14 becomes more pronounced in a manner defined later in this section.

Structure and function for circuit construction as referenced in FIG. 3 remains the same for a design coefficient K of 2.82 as for that of 1.41 as mentioned above. The principal difference being in component values and interaction with one another. FIG. 5 shows the design coefficient K selected, 2.82, as point—B on the Fn/Fo slope. FIG. 5A incorporates the same equivalent circuit model for ascertaining the AC voltage source impedance Zp during time of forced oscillation, Fo. FIG. 5B models the parallel-resonant circuit's internal components comprising the equivalent circuit during time of resonant, natural frequency oscillation, Fn.

FIG. 7 displays DSO traces for principal waveforms incorporated in functional loop—A, plotted against power switch 10 gating signal $V_{19}$. Input current $I_1$ initiates at time $T_0$ and terminates at $T_1$. Voltage $V_3$ is at the average value of the sinusoidal envelope for $-V_3$ at time $T_0$. In this case, however, the average value for the sinusoidal envelope of $-V_3$ is very nearly at the 0 (zero) volt reference line. The consequence, in the diminishing average value envelope for voltage $V_3$ being that resonant inductor 12 absorbs considerably less volt-seconds during the time power switch 10 is on. Transformer 14 input current $I_3$ illustrates impact of different component values internal to equivalent circuits in FIGS. 5A and 5B. Quadrature components no longer share comparative equality, rather predominate in their respective quadrants. One important consideration, however, is that average current remains the same during the entire composite frequency cycle of Fo+Fn. Equality in magnitude of positive or negative components in AC input current $I_3$ amp-second envelope provides operational stability to the parallel-resonant tank by forcing a low impedance to shunt the tank's inordinately high inherent impedance Zr as defined by equation 5. AC input current $I_3$ reflects the same 90° lagging phase shift with respect to AC voltage $V_3$ as demonstrated in the reference example for a design coefficient K of 1.41. Power switch 10 voltage $V_{10}$ encloses a composite waveform consisting of the DC voltage source and back-EMF generated by the flyback characteristic predicated on the specific design coefficient K employed. A comparison of power switch 10 voltage $V_{10}$ to that shown in adjacent FIG. 6 serves to illustrate the advantage provided by increasing design coefficient K on the reduced hold-off voltage impressed on power switch 10.

FIG. 10 shows DSO traces plotted against gating signal $V_{19}$. Transformer 14 output voltage $V_4$ initiates at the average value of the sinusoidal envelope for $-V_4$ at time $T_0$. Output voltage $V_4$ is terminated before the positive portion of the sine wave crosses mid-level as it decays from its peak positive value toward the 0 (zero) voltage baseline. Output filter inductor voltage $V_{17}$ is positive during this time-frame allowing output current $I_4$ to flow at this time. Fly-back current $I_5$ flows during the time $-V_4$ swings negative to a level equal to the forward voltage drop $-V_f$ of the rectifying element employed. There is a segment of time, however, when both currents $I_4$ and $I_5$ flow simultaneously. This time period is defined as output current crossover time and is illustrated in greater detail in FIG. 14.

Figure 14:
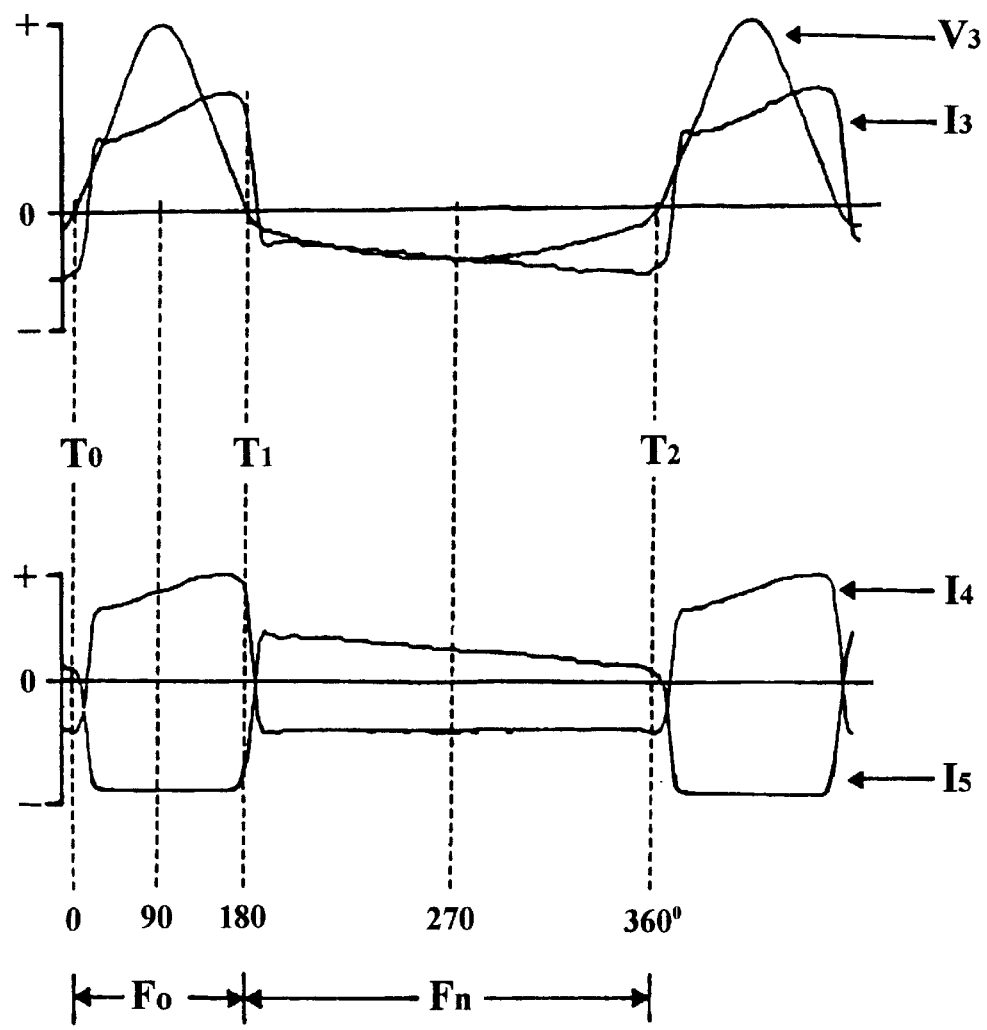
FIG. 14 shows an enlarged view of an oscillographic plot for power transformer 14 input voltage $V_3$ vs. input current 13 generated in functional loop—A, at a design coefficient K of 2.82. Input waveform plot is compared to output currents 14 and 15 flowing in functional loop—B, referenced to the angular/time baseline of 0 (zero) amplitude, for composite waveform frequency components Fo+Fn.

FIG. 14 is an expanded illustration of AC voltage $V_3$ and current $I_3$ circulated in the parallel-resonant tank circuit consisting of resonant capacitor 13 and the input winding of transformer 14. Voltage $V_3$ and current $I_3$ are plotted on a time-line referenced to 0 (zero) voltage. Voltage $V_3$ and current $I_3$ shown in FIG. 7 as well, but are referenced to power switch 10 transitions represented by power switch 10 gating voltage $V_{19}$ as applied by the PPM control circuit. The lagging 90° phase-shift between $V_3$ and $I_3$ is more clearly demonstrated in FIG. 14 by the waveforms being referenced to the 0 (zero) volt baseline. Output currents $I_4$ and $I_5$ are also included in FIG. 14 and are plotted on a vertical baseline relative to $V_3$ and $I_3$. Waveforms plotted in FIG. 14 are based on angular/time reference lines to more clearly illustrate horizontal relationships existing between both sets of waveforms. Output currents $I_4$ and $I_5$ are shown in FIG. 10, but referenced against gating voltage $V_{19}$. Waveforms plotted in FIGS. 7 and 10 do not readily discern instantaneous relationships between the two sets of waveforms due to the size of the trace and the waveform plots being presented in two separate figures where a relative baseline is difficult to visualize. FIG. 14 serves to clearly show the impact of crossover currents, $I_4$ vs. $I_5$, during transitions between Fo and Fn on input waveforms $V_3$ and $I_3$. Inspection of input current $I_3$ waveform reveals a pronounced in-phase component as depicted by the high intercept point on the leading edge vertical axis, while the shallow slope of the current pulse top indicates a comparatively light out-of-phase constituent. Output current $I_4$ and fly-back current $I_5$ are plotted against the same angular/time baseline as the input AC voltage $V_3$ and input AC current $I_3$. Waveform traces serve to illustrate current $I_3$ continuity independent of power switch 10 transitions by virtue of capacitor 13/transformer 14 combination being isolated from power switch 10. Separation of power switch 10 from the AC voltage source allows flow of a constant load current component throughout the composite frequency cycle consisting of Fo+Fn. The result is an AC power transmission cycle virtually free of noise harmonics, resulting from current interruption in the power transmission loop, which is a common source of noise in other power transfer circuits.

Figure 11:
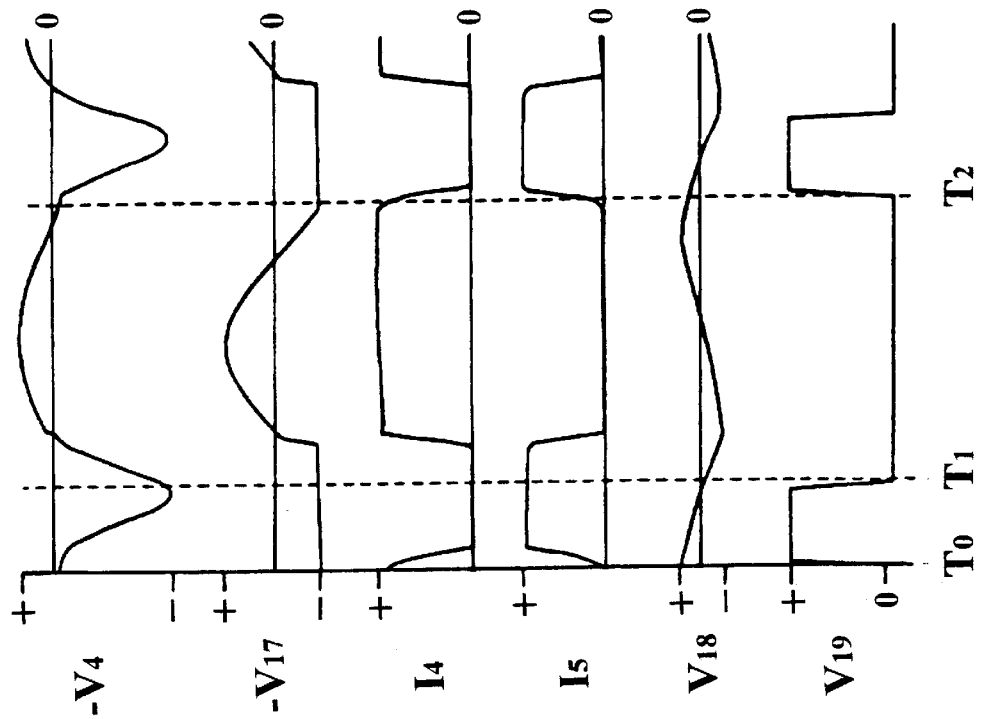
FIG. 11 illustrates an oscillographic plot of voltages and currents vs. timing signal $V_{19}$ for functional loop—B, a design coefficient K of 2.82, half-wave rectifier/filter implementation and subtractive polarity of transformer 14 output winding with respect to input winding.

Following description of circuit operation refers to the first embodiment based on a design coefficient K of 2.82 and reversal of winding polarization on transformer 14. Referring to FIGS. 3 and 7, design, function and waveforms are identical to the case for additive winding polarity described above, due to the bi-polar transfer function embedded in the AC voltage source impressed on the input winding of transformer 14. Inverting of a winding in transformer 14 results in a polarity reversal for the voltage and current waveforms generated in the pulse power train transmitted through transformer 14. FIG. 11 defines waveforms enclosed in functional loop—B for the subtractive polarity case. Transformer 14 output voltage $-V_4$ is negative during time $T_0$ to $T_1$ it initiates at the juncture of the average volt-second envelope of the positive sine wave during the positive transition of power switch 10 turn-on command signal $V_{19}$. $-V_4$ voltage turns-off at time $T_1$ when it is decaying toward 0 (zero) and is above the level of DC voltage source Vin corrected by the turns ratio of transformer 14, equal to 0.50 of $-V_4$ peak voltage. Output filter inductor voltage $-V_{17}$ is also negative at this time, allowing fly-back current $I_5$ to flow. Output voltage $-V_4$ swings positive during time $T_1$ to $T_2$, when power switch 10 is off Filter inductor voltage $-V_{17}$ also swings positive during this time allowing flow of load current $I_4$. Output ripple voltage $V_{18}$ is virtually free of noise harmonics as in the case for additive transformer 14 polarity.

The following description of circuit operation refers to the second embodiment based on a design coefficient K of 1.41. Circuit structure is that of transformer in FIG. 3 terminated by a center-tapped secondary winding as shown in FIG. 4. This configuration allows full-wave power transfer from the DC voltage source Vin to the output load during each half cycle of the composite carrier-frequency. Input functional loop—A, as described for FIG. 3 in previous design examples, establishes an AC voltage signal applied by resonant capacitor 13 to the input winding of transformer 24 which is identical to that of transformer 14. The secondary winding on transformer 24 is center-tapped as shown in FIG. 4 and routed to a full-wave rectifier/filter assembly for extraction of the DC component applied to a DC load. The operating region for a design coefficient K of 1.41 is defined as point—A in FIG. 5. Internal phasing of transformer 24 output winding in FIG. 4, is such that the voltage applied on rectifying element 25 during the time-frame of forced oscillation, Fo, loads the primary winding with the equivalent complex load circuit depicted in FIG. 5A. While power transfer during time of resonant frequency component, Fn, is loaded by the equivalent circuit shown in FIG. 5B. Thus; forced oscillation power pulse, Fo, establishes the 90° lagging phase shift in the primary winding of transformer 24 while the resonant power pulse, Fn, delivers a specific quantum of energy to the rectifier/filter assembly via rectifying element 26 as a fly-back transfer function.

FIG. 6 illustrates principal waveforms embodied in functional loop—A. This portion of the over-all transmission train remains the same for all design routines and circuit configurations based on a design coefficient K of 1.41.

FIG. 12 waveforms depict full-wave rectification as defined by circuit construction in FIG. 4, referenced to power switch 10 gating signal $V_{19}$. $V_4$ swings positive during time $T_0$ to $T_1$ when power switch 10 is ON as indicated by positive level of gating signal $V_{19}$. Output filter inductor voltage $V_{27}$ swings positive allowing current $I_4$ to flow while transformer 24 output voltage $V_4$ is positive with respect to output voltage Vo. Power switch 10 turns-off when transformer 24 output voltage is past its peak and has decayed to a level below the average volt-second envelope but above the reflected level of DC voltage source Vin projected against transformer 24 output voltage $V_4$. Transformer 24 output voltage $-V_4$ swings positive during time, $T_1$ to $T_2$, of timing signal $V_{19}$. Output voltage pulse $-V_4$ is created by release of stored energy in the transformer's magnetic flux field. This event occurs during generation of the fly-back transfer function in the natural oscillation, Fn, time-flame. Output inductor voltage $-V_{27}$ also swings positive during this time-frame allowing fly-back current $-I_4$ to flow. Thus, output current flows continuously in the output winding of transformer 24 consistent with input current $I_3$ flow throughout the entire composite cycle as shown in FIG. 6. Output ripple voltage $V_{28}$ describes an AC voltage component consistent with current flow through the rectifier/filter assembly and output load. The resulting AC ripple waveform is virtually free of noise harmonics common to other techniques employed in design of switched power converters.

It is noteworthy to comment at this juncture that review of voltages $V_{27}$ and $V_{28}$ reveal waveform asymmetry introduced by a design coefficient K of 1.41. Whereas it is obvious that a design coefficient K of 1.19 would result in equalized sine/cosine voltages produced by T24 output winding, leading to a balanced output ripple voltage of lesser over-all amplitude. A design coefficient K equal to 1.19 is feasible so long as it is consistent with the hold-off voltage stipulation for power switch 10.

Design and fabrication techniques applied to production hardware are generally well known throughout the power conversion industry. These design and manufacturing techniques include, but are not necessarily limited to; multi-layer pc boards with appropriate ground planes and land routing to minimize cross-talk and noise coupling. Planar or coaxial magnetic component construction to increase frequency bandwidth for signal transmission through a magnetic interface. Hybrid and/or monolithic electronic circuitry, high density low profile capacitor geometries and substitution of passive output rectifiers with power FET's to institute synchronous rectification and utilize functional advantage of first and third quadrant operation.

Those skilled in the art and practice of power converter design can, through the process of synthesis, envision other associated and obvious embodiments. These observations are intended to reside within the scope of this invention, as further defined in appended claims.

Power transfer at ultra-low output voltages, of 1.OV or less, requires consideration of the amount of load current to be circulated: not, necessarily, power level delivered to the load. Circuit descriptions included herein focus on ultra-low output DC voltage applications using a single output to illustrate power transfer mechanism. Principles embodied in the invention will perform with equal suitability in higher output voltage applications.

Class of components used in the reduction-to practice model:
Magnetics: Toroidal MPP cores.
Capacitors
  A) Resonant. NPO ceramic.
  B) Filtering: X7R ceramic, solid tantalum and dry aluminum electrolytic.
Power switch: Power-FET/p-n junction rectifier, series combination.
Rectifying elements: Schottky diodes.
Control circuit: Commercial IC's.

What is claimed is:

1. A resonant power converter with AC full-wave primary-side resonance and zero-current switching adapted to convert power from an input DC voltage source to a DC terminal output load comprising:
   an input stage configured to receive a first power signal from a DC input source;
   an AC full-wave magnetic interface configured to receive a second power signal from said input stage;
   an output stage configured to impose an output signal across a load by receiving said second power signal from said magnetic interface; and
   wherein said input stage includes a zero-current switch topology comprising a resonant capacitor, a resonant inductor and a unidirectional conducting device with a switching element arranged in series within said zero-current switch.

2. The resonant power converter of claim 1 wherein said magnetic interface further comprises:
   an input winding and a non-polarized output winding wherein said input winding is connected to said input stage and said output winding is connected to said output stage.

3. The resonant power converter of claim 2 wherein said magnetic interface input winding is connected in parallel with said resonant capacitor.

4. The resonant power converter of claim 2 wherein said output stage further comprises:
   a rectifying element, a filter inductor connected to said rectifying element, a filter capacitor connected to said filter inductor and a fly-back rectifying element connected to said filter inductor.

5. The resonant power converter of claim 4 wherein said output stage filtering elements may be implemented in any combination of half or full-wave rectifier/filter configuration.

6. The resonant power converter of claim 1 further comprising:
   a control mechanism connected to said zero-current switch configured to selectively vary said switching element between an open and a closed position.

7. The resonant power converter of claim 6 wherein said control mechanism comprises a pulse-position-modulation (PPM) control mode as a negative feedback loop.

8. The resonant power converter of claim 6 wherein said PPM control mode further comprises:

a sensor configured to open said switching element upon cessation of current in said zero-current switch.

9. The resonant power converter of claim 3 further comprising:

a power transfer function wherein said resonant capacitor offers a full-wave AC voltage source to said input winding of said magnetic interface in isolation from said switching element situated within said zero-current switch.

10. The resonant power converter of claim 7 wherein said PPM control mode initiates a forced frequency, Fo, component upon said resonant capacitor and said magnetic interface input winding during the positive region of the full-wave sinusoidal transition.

11. The resonant power converter of claim 7 wherein said PPM control mode initiates a resonant frequency, Fn, component upon said resonant capacitor and said magnetic interface input winding during the negative region of the full-wave sinusoidal transition.

12. The resonant power converter of claim 7 wherein said PPM control mode combines said forced frequency, Fo, with said resonant frequency, Fn, to synthesize a composite full-wave sinusoidal carrier-frequency comprised of said frequency component Fo, and said frequency component, Fn.

13. The resonant power converter of claim 11 wherein peak voltage amplitude of said resonant component, Fn, appears additive with said input DC voltage source to impose the hold-off voltage sustained by said unidirectional conducting device in combination with said switching element within said zero-current switch.

14. The resonant power converter of claim 12 wherein a design coefficient, K, introduces a maximum duty cycle [1/(1+K)] allowed by said PPM control on said zero-current switch.

15. The resonant power converter of claim 7 wherein said PPM negative feedback control loop monitors said output signal across said load and upon sensing an out-of-limit deviation alters time between pulses to said switching element to restore said output signal within prescribed limits.

* * * * *